(12) United States Patent
Monk et al.

(10) Patent No.: US 11,373,427 B1
(45) Date of Patent: Jun. 28, 2022

(54) SPECIES PATTERN EVALUATION

(71) Applicants: Harold Monk, Pride, LA (US); Jason Ray, Denham Springs, LA (US); Darryl Monk, Pride, LA (US)

(72) Inventors: Harold Monk, Pride, LA (US); Jason Ray, Denham Springs, LA (US); Darryl Monk, Pride, LA (US)

(73) Assignee: WISEEYE TECHNOLOGY LLC, Denham Springs, LA (US)

( * ) Notice: Subject to any disclaimer, the term of this patent is extended or adjusted under 35 U.S.C. 154(b) by 0 days.

(21) Appl. No.: 17/146,144

(22) Filed: Jan. 11, 2021

Related U.S. Application Data

(63) Continuation-in-part of application No. 16/510,679, filed on Jul. 12, 2019, now Pat. No. 10,888,085.

(60) Provisional application No. 62/789,763, filed on Jan. 8, 2019.

(51) Int. Cl.
| | |
|---|---|
| *G06V 40/10* | (2022.01) |
| *G06K 9/62* | (2022.01) |
| *A01K 23/00* | (2006.01) |
| *A01K 29/00* | (2006.01) |
| *G06V 20/52* | (2022.01) |
| *H04N 7/18* | (2006.01) |

(52) U.S. Cl.
CPC ............ *G06V 40/10* (2022.01); *A01K 29/005* (2013.01); *G06K 9/6201* (2013.01); *G06V 20/52* (2022.01); *H04N 7/181* (2013.01)

(58) Field of Classification Search
None
See application file for complete search history.

(56) References Cited

U.S. PATENT DOCUMENTS

| | | | |
|---|---|---|---|
| 9,295,225 B2 | 3/2016 | Monk et al. | |
| 10,292,363 B2 | 5/2019 | Monk | |
| 10,674,703 B2 | 6/2020 | Monk | |
| 2005/0212912 A1* | 9/2005 | Uster | H04N 7/188 348/143 |
| 2016/0026895 A1* | 1/2016 | Huffman | A01K 29/005 382/110 |
| 2019/0012535 A1* | 1/2019 | Collins | G06V 20/38 |

* cited by examiner

*Primary Examiner* — Talha M Nawaz
(74) *Attorney, Agent, or Firm* — John B. Edel; Edel Patents LLC

(57) ABSTRACT

Methods of evaluating populations of deer are disclosed that include receiving a series of images containing deer; utilizing artificial intelligence object detection to identify deer from the series of images; utilizing spatial relationships between points to create an image scale; identifying a set of metrics associated with the deer; evaluating the gender of the deer; and utilizing a repeat matching technique to evaluate if the deer is a likely reappearance of a previously identified deer.

6 Claims, 5 Drawing Sheets

SPECIES PATTERN EVALUATION

This application is a continuation-in-part of U.S. application Ser. No. 16/510,679, filed Jul. 12, 2019; which claims the benefit of U.S. Provisional Application No. 62/789,763, filed on Jan. 8, 2019.

Methods of evaluating the patterns of species within the habitat described herein may be used in wildlife conservation, for wildlife feeding, animal watching and for hunting. Certain embodiments disclosed herein may provide predictive estimates of the probability of a certain species being present during a future time period.

DETAILED DESCRIPTION

Example Set 1

Figure 1:
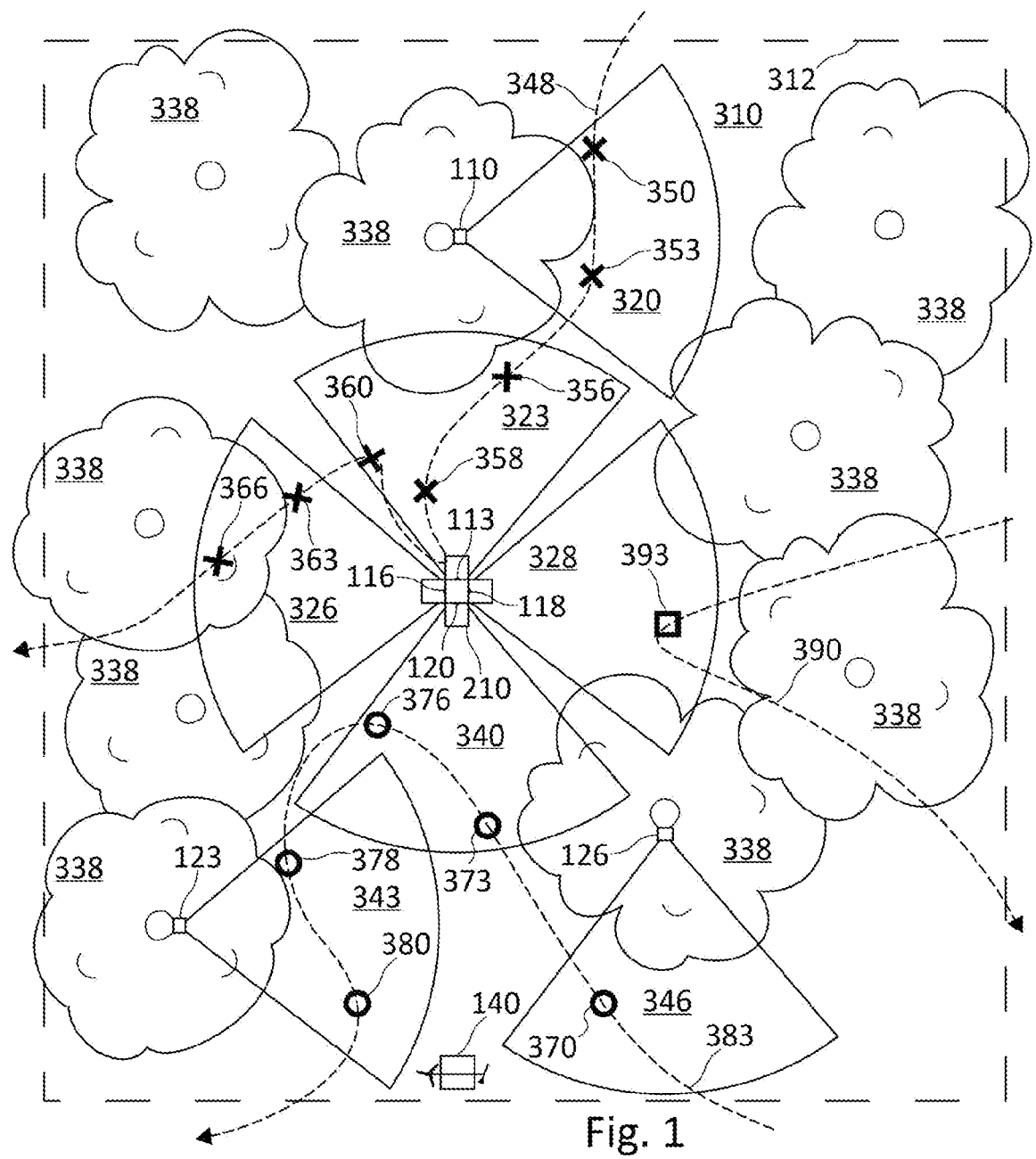
FIG. 1 shows an animal activity area.

FIG. 1 of the drawings depicts a First camera 110, a Second camera 113, a Third camera 116, a Fourth camera 118, a Fifth camera 120, a Sixth camera 123, a Seventh camera 126, Weather station 140, Feeder 210, Animal activity area 310, Animal activity area boundary 312, First camera plot 320, Second camera plot 323, Third camera plot 326, Fourth camera plot 328, Tree 338, Fifth camera plot 340, Sixth camera plot 343, Seventh camera plot 346, a First animal path 348, a First animal path first location 350, a First animal path second location 353, a First animal path third location 356, a First animal path fourth location 358, a First animal path fifth location 360, a First animal path sixth location 363, a First animal path seventh location 366, Second animal path first location 370, Second animal path second location 373, Second animal path third location 376, Second animal path fourth location 378, Second animal path fifth location 380, Second animal path 383, Third animal path 390, and Third animal path first location 393.

First camera 110 may be located on Tree 338 and it may monitor First camera plot 320 within Animal activity area 310. Second camera 113 along with Third camera 116, Fourth camera 118 and Fifth camera 120 may be located on Feeder 210, which may be either a conventional feeder or a feeder having species recognition capabilities. Second camera 113, Third camera 116, Fourth camera 118 and Fifth camera 120 may be directed to monitor Second camera plot 323, Third camera plot 326, Fourth camera plot 328 and Fifth camera plot 340 respectively. A variety of Trees 338 along with other foliage and terrain may be present within Animal activity area 310. Sixth camera 123 may be positioned on a Tree 338 such that it is directed to monitor Sixth camera plot 343. Seventh camera 126 may be positioned on a Tree 338 such that it is directed to monitor Seventh camera plot 346. Weather station 140 may be used to gather additional contextual data. Weather station 140 may include equipment capable of monitoring temperature, humidity, barometric pressure, wind speed, wind direction, dewpoint, rainfall, ultraviolet radiation levels and visible radiation levels and may be configured to either record or communicate such information over time in a manner that would allow the matching of camera data to data gathered from Weather station 140 on a date and time basis. Animal activity area 310 is bounded by Animal activity area boundary 312 and Animal activity area 310 may represent a general area in which a person is interested in tracking the presence of one or more species. Each of First camera plot 320, Second camera plot 323, Third camera plot 326, Fourth camera plot 328, Fifth camera plot 340, Sixth camera plot 343 and Seventh camera plot 346 represent individual areas within Animal activity area 310 that may overlap but that do not need to overlap. The presence of multiple plots within Animal activity area 310 allows for the position-based tracking of animals of individual species. Depending on the system capabilities the monitoring of individual animals may be tracked back to a plot generally or may be identified as being in a particular area within the plot. First animal path 348 represents a path along which a first animal may travel. First animal path first location 350, First animal path second location 353, First animal path third location 356, First animal path fourth location 358, First animal path fifth location 360, First animal path sixth location 363 and First animal path seventh location 366 are each positions along the First animal path 348 within individual plots being monitored by the cameras. Similarly, a second animal may move through Animal activity area 310 along a Second animal path 383. Second animal path first location 370, Second animal path second location 373, Second animal path third location 376, Second animal path fourth location 378, Second animal path fifth location 380 are each positions along the Second animal path 383 within individual plots being monitored by the cameras. Further, a third animal may move through Animal activity area 310 along a Third animal path 390. Third animal path 390 Third animal path 390 may contain a Third animal path first location 393 representing a location within Fourth camera plot 328.

By way of example, First animal path 348 may represent the path of a first deer traveling through Animal activity area 310, Second animal path 383 may represent the path of a wild boar traveling through Animal activity area 310 and Third animal path first location 393 may represent the path of a second deer traveling through Animal activity area 310. Table 1 below represents a data set that may reflect the paths of those animals through Animal activity area 310.

TABLE 1

| Image | Location | Animal | Time |
|---|---|---|---|
| CM01-20180709094740.jpg | 30.680681, −91.227697 | Deer | 07/09/2018 09:47:40 CDT |
| CM01-20180709094840.jpg | 30.680681, −91.227697 | Deer | 07/09/2018 09:48:40 CDT |
| CM02-20180709094915.jpg | 30.680169, −91.227594 | Deer | 07/09/2018 09:49:15 CDT |
| CM02-20180709095015.jpg | 30.680169, −91.227594 | Deer | 07/09/2018 09:50:15 CDT |
| CM02-20180709095115.jpg | 30.680169, −91.227594 | Deer | 07/09/2018 09:51:15 CDT |
| CM03-20180709095205.jpg | 30.679680, −91.228121 | Deer | 07/09/2018 09:52:05 CDT |
| CM03-20180709095305.jpg | 30.679680, −91.228121 | Deer | 07/09/2018 09:53:05 CDT |
| CM07-20180709113052.jpg | 30.677377, −91.226624 | Wild boar | 07/09/2018 11:30:52 CDT |
| CM05-20180709113245.jpg | 30.678223, −91.228066 | Wild boar | 07/09/2018 11:32:45 CDT |
| CM05-20180709113345.jpg | 30.678223, −91.228066 | Wild boar | 07/09/2018 11:33:45 CDT |
| CM06-20180709113427.jpg | 30.677928, −91.228981 | Wild boar | 07/09/2018 11:34:27 CDT |

TABLE 1-continued

| Image | Location | Animal | Time |
|---|---|---|---|
| CM05-20180709113527.jpg | 30.677928, −91.228981 | Wild boar | 07/09/2018 11:35:27 CDT |
| CM05-20180709142218.jpg | 30.679681, −91.226192 | Deer | 07/09/2018 14:22:18 CDT |

The animal activity area may be an area where there are a variety of species that interact with one another or species that have activity patterns that correspond to some extent on the activity patterns of other species in the area. Such relationships may include predator prey relationships and other relationships such as shared feeding patterns or common dietary needs. For example, the likelihood of a herbivore being present may be negatively correlated with the presence of either a carnivore or *omnivore*. In certain examples, three or more cameras are present in the animal activity area. In a related set of examples, four or more cameras are present in the animal activity area. In many cases a hunting stand or an observation point from which humans may observe wildlife is present in the animal activity area. In many such cases the hunting stand her observation point is arranged to view one or more plots that are monitored by the cameras.

In certain examples the cameras are set up to have wireless antennas arranged and configured to relay data from one camera in a manner sufficient to minimize human activity in the animal activity area. In certain such cases data may be relayed to a single camera or other device from which a user wirelessly retrieves the data. The positioning of the cameras and any other devices involved in the relaying of information may be configured such that a human gathering the data need not enter the animal activity area. This may be accomplished in a variety of ways including placing a camera or other data relay device having wireless communication capabilities close enough to a human accessible area outside of the animal activity area that the human accessible area is within wireless communication range of the camera or data relay device. In many such cases the distance between wireless communication devices in the data relay network is less than ½ mile. In another embodiment, data is relayed to a camera or other device having cellular communication capabilities and that device communicates the data to a user accessible device such as a cellular phone, computer, tablet or server. The data collected and conveyed to the user may include photographs in bulk, photographs of animals recognized as belonging to a preferred group of species being tracked or data relating to animal activity that does not contain photographs and combinations thereof.

In many cases an animal feeder may be in the animal activity area. The feeder may have a camera associated with it. In cases where the feeder has an associated camera, that camera may have species recognition capabilities. A variety of other automated or non-automated feeders and animal attractants, including salt attractants, may be used to enhance the animal activity in animal activity area.

Cameras in the animal activity area may be directed to individual plots through which animals are likely to traverse. Such plots may include trails, clearings, other suitable terrain and portions thereof. Cameras may be arranged to photograph those plots based on detected motion in the plots and those cameras may take at least one photograph every 30 seconds during periods of identified motion.

Data generated, handled, processed and used by the system disclosed herein may be handled by a computer application, a portable device application, servers and/or software/hardware combinations residing on any number of devices disclosed herein. In one example, the species recognition may be conducted by the individual cameras within an animal activity area that monitor that animal activity area.

In certain examples, animal recognition being conducted by the individual cameras within an animal activity area may serve to generate data of predictive value relating to the species present and simultaneously be used to selectively feed one or more species to the exclusion of all other species. Measures that may be activated and deactivated by the individual cameras within an animal activity area may include engaging and disengaging one or more electrical shock deterrents and opening and closing feeder doors.

Figure 3:
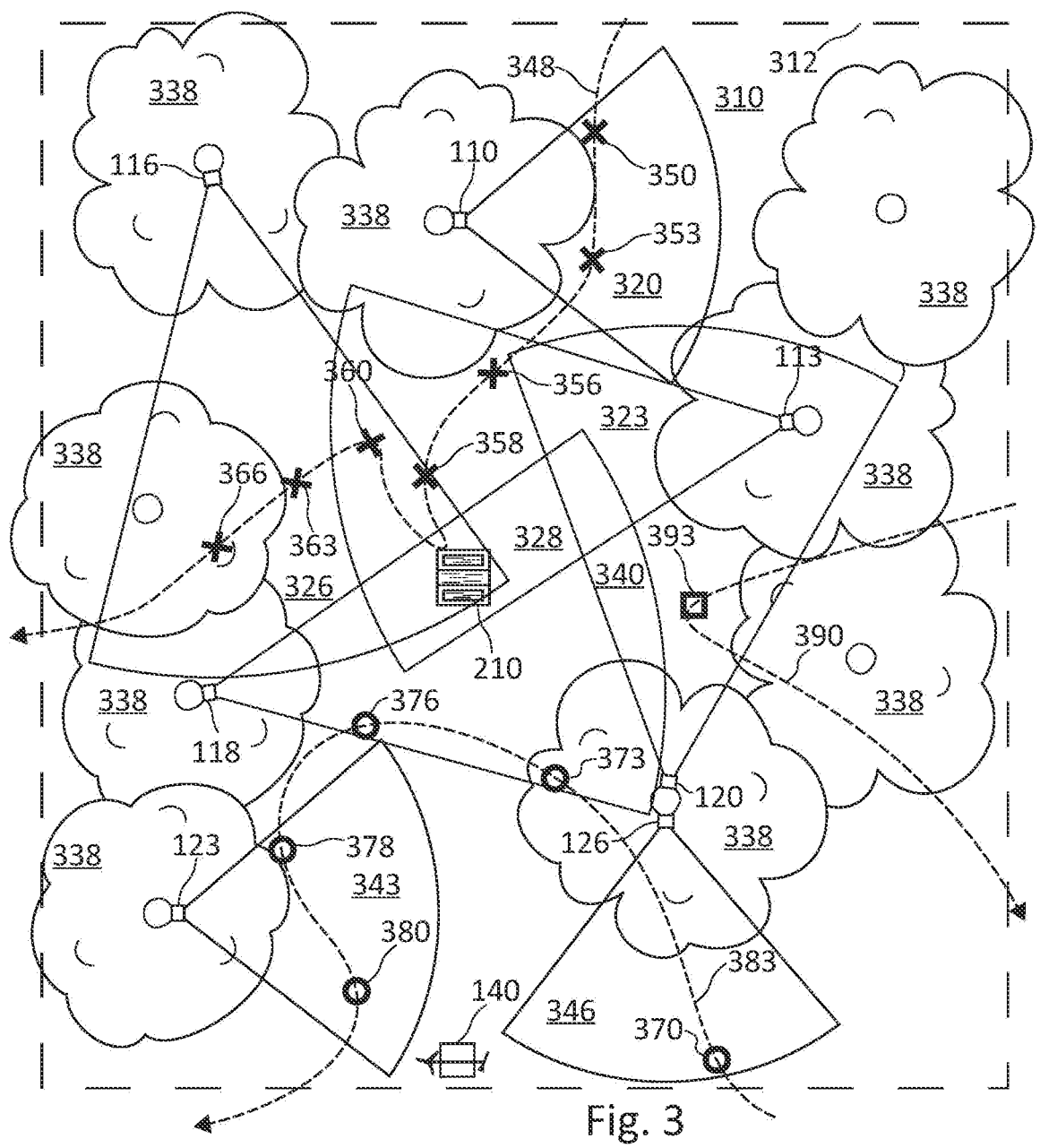
FIG. 3 shows an animal activity area.

FIG. 3 of the drawings depicts: First camera 110, Second camera 113, Third camera 116, Fourth camera 118, Fifth camera 120, Sixth camera 123, Seventh camera 126, Weather station 140, Feeder 210, Animal activity area 310, Animal activity area boundary 312, First camera plot 320, Second camera plot 323, Third camera plot 326, Fourth camera plot 328, Tree 338, Fifth camera plot 340, Sixth camera plot 343, Seventh camera plot 346, First animal path 348, First animal path first location 350, First animal path second location 353, First animal path third location 356, First animal path fourth location 358, First animal path fifth location 360, First animal path sixth location 363, First animal path seventh location 366, Second animal path first location 370, Second animal path second location 373, Second animal path third location 376, Second animal path fourth location 378, Second animal path fifth location 380, Second animal path 383, Third animal path 390 and Third animal path first location 393. First camera 110, Second camera 113, Third camera 116, Fourth camera 118, Fifth camera 120, Sixth camera 123 and Seventh camera 126 may each monitor animal activity within the Animal activity area boundary 312. Weather station 140 may gather local weather and environmental information. Feeder 210 may be a conventional animal feeder, or it may be a feeder with a wireless communication antenna configured to communicate with cameras in the Animal activity area boundary 312. As depicted, Feeder 210 is a two door feeder with wireless communication capability and an electrical shock deterrent that operates in response to instructions to the nearby cameras. Feeder 210 may have the capability to engage and disengage one or more electrical shock deterrents and open and close its feeder doors based on the presence or absence of various species recognized by the cameras and may further be able to operate those and other features based on other information gathered by the system and predictions made by the system. Animal activity area 310 has Animal activity area boundary 312 within which the cameras are situated. Each of the cameras may be mounted on a Tree 338 or other objects stable enough for mounting. First camera plot 320, Second camera plot 323, Third camera plot 326, Fourth camera plot 328, Fifth camera plot 340, Sixth camera plot 343 and Seventh camera plot 346 are the areas monitored by the respective cameras and those plots may overlap. In particular, the individual plots may overlap in the area immediately surrounding Feeder 210. This overlap may allow for monitoring of the full surroundings of Feeder 210 including the area immediately adjacent to Feeder 210 which may be difficult to capture by cameras mounted on Feeder 210. In an example in which a deer traverses First animal path 348, First camera 110 may capture photograph or video record the deer at First animal path first location 350 and First animal path second location 353. In doing so, First camera 110 may evaluate the images to ascertain that the deer is a deer. If deer is the species that is targeted for feeding and Feeder 210 is configured to have closed doors by default and to have an electrical shock deterrent armed by default, First camera 110 may then instruct Feeder 210 to disarm the electrical shock deterrent and open the feeder doors so that those doors may be open in the event that the deer approaches the feeder. If deer is the species that is targeted for feeding and Feeder 210 is configured to have open doors by default and to have an electrical shock deterrent disarmed by default, First camera 110 may then either by instruction or omission of instruction have Feeder 210 maintain the disarmed electrical shock deterrent and open feeder doors so that those doors may be open in the event that the deer approaches the feeder. In an alternate scenario in which the animal traversing First animal path 348 were an animal not targeted for feeding such as a wild boar, First camera 110 would conduct species recognition on the animal and instruct Feeder 210 to either achieve or maintain a non-feeding deterrent status. That nonfeeding deterrent status may include having the doors to the feeder closed and having the electrical shock deterrent armed. When the deer passes First animal path third location 356 Second camera 113 may capture the presence of the deer, recognize the species and communicate instructions to Feeder 210 so that the feeder remains ready to feed the deer. Appropriate delays may be utilized within the system of cameras and feeder such that when the deer passes into areas not within the view of any camera that the feeder may remain ready to feed the deer for a period of time which may be a preset period of time. If no deer or other animal is detected by any of the cameras and the period of time elapses Feeder 210 may return to its default state. First animal path fourth location 358 and First animal path fifth location 360 are located in the immediate vicinity of the feeder and are located within the field of view of both Second camera 113 and Third camera 116. In circumstances when an animal is identified by two cameras simultaneously, that information may be utilized to more precisely indicate the location of the animal. Also, in circumstances where the species being fed is not disturbed by sounds such as the opening of doors on Feeder 210, Feeder 210 may delay opening until an animal targeted for feeding is identified as being adjacent to Feeder 210. Returning to the example in which a deer traverses First animal path 348, that deer may then pass through First animal path sixth location 363 and First animal path seventh location 366 after which it may disappear from the field of view of any camera. After disappearing from the field of view and the passage of an appropriate period of time, the feeder may return to a default state.

A second animal may traverse the Second animal path 383. That second animal may be a predator of a species selected for feeding. For example, the second animal may be a coyote when the species selected for feeding is a deer. Upon the second animal reaching Second animal path first location 370, Seventh camera 126 may recognize the second animal as an animal that should not be fed and instruct Feeder 210 to close the feeder doors and to arm the shock deterrent. The selection of when to carry out instructions relating to the opening and closing of doors on the feeder and to the arming and disarming of the shock deterrent on the feeder may differ depending on the species being targeted for feeding and the nature of the species not targeted for feeding. For example, if deer are being fed, Feeder 210 may close its feeding doors as soon as a predatory species is identified within Animal activity area 310, but wait to activate the electric shock deterrent until the predatory species is identified within a plot that encompasses Feeder 210. Namely, the electric shock deterrent may arm itself in response to any of Second camera 113, Third camera 116 and Fourth camera 118 identifying the presence of the predatory species. Thus, the presence of a predatory species at Second animal path second location 373 or Second animal path third location 376 may lead to the arming of the electrical shock deterrent. As the predatory species traverses through Second animal path fourth location 378 and Second animal path fifth location 380 and eventually disappears from the view of any camera in Animal activity area boundary 312, Feeder 210 may return to its default configuration. A third animal for example, may traverse Third animal path 390 and be identified as either a member of the species to be fed or a member of a species that is not to be fed when located at Third animal path first location 393. Because Fifth camera plot 340 does not encompass Feeder 210, but is near to Feeder 210 depending on the user preference or settings for the system the deer at Third animal path first location 393 may be handled in a manner similar to either plots that encompass Feeder 210 or plots that are more distant from Feeder 210. The selection of which cameras have which impact on the behavior of Feeder 210 may be done based on the geographic location of the cameras relative to the location of the feeder or based on the geographic location of the plots monitored by the cameras.

Systematic decisions may be made in furtherance of goals such as the feeding of deer to the complete exclusion of other animals. Such systematic decision making may be programmed into the cameras and account for the location of either the plots or the cameras. For example, Feeder 210 may remain open so long as the weather conditions would not contribute to the spoilage of food and so long as no other animals are identified by any of the cameras within Animal activity area 310. When a non-deer species is identified by a camera within Animal activity area 310 the doors of Feeder 210 may close until no non-deer species have been identified within Animal activity area 310 for a period of five minutes. If a non-deer species is identified in a plot that is within 100 feet of Feeder 210 the shock deterrent may be activated and remain activated until no non-deer species have been identified within any of those plots for a period of five minutes. These examples of feeder and camera interaction have wide ranges of applicability and may cover examples as simple as a single camera monitoring a single feeder to examples having large numbers of camera and feeders covering multiple animal activity areas.

Errors in animal recognition may take many forms including false positives, false negatives and identification of an animal as being a member of an incorrect species group. An error reporting system may be integrated into user interface allowing either the reporting of such errors to a central database or administrator of the central database for further optimization of the species recognition system. In another embodiment, which may occur independently or in conjunction with central reporting, the user would identify the error or the correct identification that should have been reported by the species recognition device to the user interface allowing for a local further optimization of the species recognition system.

Images from the various cameras may be taken in response to motion identified by those cameras. Recognition software may be used to identify individual animals as members of a particular species in a variety of ways. In one example, each individual camera contains the hardware and necessary program to identify the members of a particular species in a manner sufficient to develop a record set for that camera sufficient to at least identify the species and the time at which the image of the species was captured. In another example, the collection of pictures is transferred to a device having those capabilities which would utilize recognition software to identify the pictures having individual animal species and identify those species in a manner sufficient to associate the animal containing pictures with a time and place. Time date stamps or some other equivalent piece of information sufficient to identify when a picture was taken would typically be associated with the record of the presence of the species. Location information may be gathered in a variety of ways including identifying the GPS location of the camera, identifying the GPS location of the camera along with a direction the camera was pointing, identifying the GPS location of a camera with a phone or other GPS capable device, identifying a plot being monitored with a phone or other GPS capable device or by selecting a location on a map such as a digital map that may be electronically accessed. The data necessary to identify the time, place and picture depicting the species that were present may be stored in a database, organized in a folder system, stored in a text file, stored in image file names or preserved by other means sufficient to preserve that information for later evaluation. The later evaluation of that data may be used to predict the probability of a particular species appearing at a particular time. Using FIG. 1 as a reference, the probability of an animal of a particular species appearing within the animal activity area during a future time period may be evaluated or the probability of a particular species appearing within an individual plot during a future time period may be evaluated.

A variety of application programming tools and interfaces may be used in the recognition of species. Among the image recognition capable application programming interfaces that may be used are the DeepDream computer vision program by Google Inc., the OpenCV library from https://opencv.org/, TensorFlow software library by Google Inc., Cloud Vision API by Google Inc., Clarifai API by Clarifai, Inc. of 137 Varick Street, 3rd Floor, NY, N.Y. 10013, Amazon Rekognition software by Amazon.com, Inc. by 410 Terry Ave. North, Seattle, Wash., 98109-5210. Google Inc. is located at 1600 Amphitheatre Parkway, Mountain View, Calif., U.S.

The analytical step of recognizing individual species may occur within a camera or on a separate device. Similarly, the providing of information, feedback and reports utilizing data described herein may be presented on any device having a user interface.

The identification of species as described herein commonly refers to species as may be identified in a biological sense, but the data gathering, data analysis, data reporting, recognition and predictive work conducted may be broken down into much smaller identified groups which may be referred to as sub species. For example, and identified species, such as deer, may be broken down into a variety of categories, such as buck, doe, and fawn. Categories and identifications by recognition need not be mutually exclusive. For example, deer may be classified as being with antlers and without antlers in addition to other features. Further, recognition may extend beyond simple classification and include grading or other measurements. For example, a Boone and Crockett score may be predicted based on a picture of a buck. It should be understood that any descriptions of species recognition and the handling of associated data includes the possibility of to recognition of smaller identified groups such as sub species and of such grading as alternate embodiments of the describe recognition and data handling.

The data set gathered may be presented to the user of that data in a variety of ways. Examples of such presentation include bar charts showing the prevalence of individual species over a series of daily time periods and bar charts comparing the species activity for a series of daily time periods across a span of multiple days. Bubble charts plotted over a map of the animal activity area may be used to show the prevalence of particular species at different plots with the animal activity area and other presentation methods having the capability of selecting time periods and different species for display may also be used. In another example, an animation may be used to graphically indicate a potential path or the paths that an animal or multiple animals may have taken through the animal activity area in a way that shows the time dependence of the various animals presence within the plots Local weather data such as temperature, pressure, humidity and wind speed may be used to enhance the data set and display the activity of a particular species relative to such factors. For example, plots or other outputs may be generated to display the number of deer identified for particular time period when the temperature is above 80° F. with a separate plot or output for the same time. Displaying the number of deer identified when the temperature is below 80° F. Weather data may be gathered directly from data produced by a weather station such as Weather station 140 or it may be gathered from a source such as Internet reports of weather from a nearby weather station.

The data set may further be enhanced by solar data, lunar data, cloud cover information and a variety of other factors experienced by the animals present. Information gathered from secondary sources may include information such as moon phase, sunrise time, sunset time. Examples of solar data may include data indications of day or night, indications of solar altitude (measured for example in degrees) and/or Azimuth (measured for example in degrees). Examples of lunar data may include data indications of whether or not the moon is visible, indications of lunar altitude (measured for example in degrees), Azimuth (measured for example in degrees), moon phase, percentage of the moon that is illuminated. Similarly, cloud cover data may be added to the data set.

An example of the types of data that may be included in an individual image data set that is part of a larger data set made up of many individual image data sets that may be analyzed for predictive purposes is presented below in Table 2.

TABLE 2

| Data Type | Example |
| --- | --- |
| image filename | CM02-20180709094915.jpg |
| GPS location | 30.680169, −91.227594 |
| Identified species | Deer |
| Identified animal subgroup | Buck |
| Time date stamp | Jul. 9, 2018 09:49:15 CDT |
| Temperature | 85° F. |
| Dew point temperature | 58° F. |
| Barometric pressure | 1.025 bar |
| Raining | No |
| Ultraviolet radiation index | 8 |
| Day/night | Day |
| Solar altitude | 26° |
| Lunar altitude | 155° |

TABLE 2-continued

| Data Type | Example |
| --- | --- |
| Moon phase | Full |
| Percentage of moon illuminated | 98% |

Data sets such as the data in Table 2 and a large number of variations containing similar data may be used as part of a data set used for prediction of animal activity.

Example animals that could be selected for identification include turkeys, black bears, whitetail deer, hogs, humans, birds, raccoons and squirrels. However, it should be understood that the set of potentially relevant species is as wide as the number of species in any particular animal activity area. Further, a broad list of species that may be tracked can be limited down to a smaller list of species relevant to the interest of a particular user in a way that information for which the user has no user interest is not presented to that user.

Figure 2:
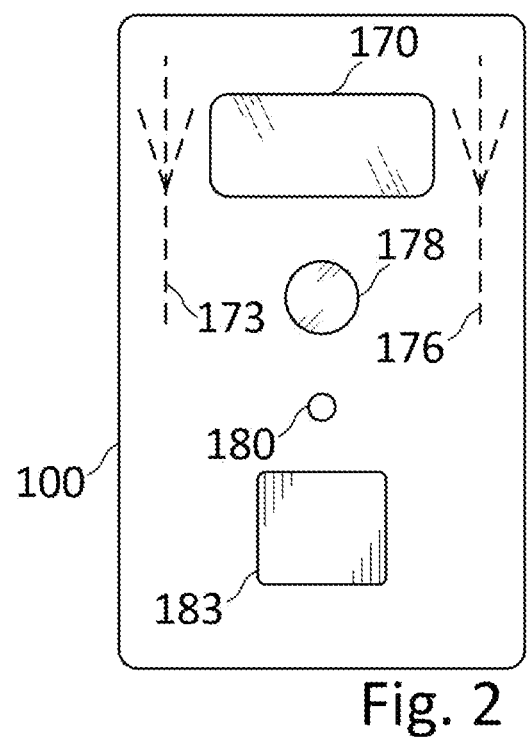
FIG. 2 shows a wildlife camera.

FIG. 2 of the drawings depicts Camera 100 which may comprise Flash 170, Communication antenna global positioning system antenna 176, Camera lens 178, Combination pressure, temperature and humidity sensor 180 and Motion detector 183.

Images may be viewed by plot, viewed by camera or by any of the other various criteria for which there is sortable data.

Animal activity plots may be generated based on the time of day. For example a bar chart of hourly deer activity may be generated. Similarly plots of animal activity by location may be generated including plots that show animal activity on a plot by plot basis.

A variety of notifications may be provided based on either the species recognition results or based on predictive evaluations made by the system. Such notifications may, for example be by text message to a cellular telephone or by email. The number of criteria on which such notifications may be based may be as large or nearly as large as the number of criteria and datatypes described herein. For example, a hunter may be notified each time a deer is identified. A similar notification may be provided whenever a deer with a particular Boone and Crockett score is identified. As a further example, a hunter may notified when the probability of seeing a deer on a particular plot or within the animal activity area exceeds a certain threshold probability. Such notices may, for example, include information such as "there is an estimated 65% probability that a deer will be in the animal activity area between 6 AM and 9 AM tomorrow morning." Further notifications may be provided when there is a identified two or three day pattern of animal activity.

Animal activity may be reported or displayed according to environmental factors such as the number of incidents of a particular animal when wind speed is above 10 mph.

Photos of animals may be displayed with additional contextual information such as temperature, relative humidity wind speed, wind direction barometric pressure, time picture was taken, date picture was taken, moon phase, sunrise time, sunset time, moonrise time, moon peak time, and moonset time.

The system may be configured to grant the user the ability to remotely erase pictures from wherever picture data is stored. Further the system may allow for the modification of the names of plots, the names of cameras and the ability to alter a variety of camera and system settings either remotely or at the camera through a variety of means including the operation of an application on a mobile device.

Data gathered may be subjected to a pattern evaluation through the use of data queries, evaluation of charts, evaluation of graphs and/or evaluation of other forms of reports based on the data set. Specific patterns may be identified. For example, it may be observed that most deer identified during nighttime hours are identified when the moon is visible and at least 70% illuminated.

After a sufficient quantity of data is accumulated, a selected group of individual components of the data set may be used as independent variables for correlation to predict the probability that a certain species will be present during a certain time period. Such correlations may be done by regression analysis which may include linear regression. The linear regression may involve a least squares regression or may involve other forms of linear regression. Nonlinear regression, nonparametric regression and other forms of regression are also contemplated.

Further, pattern recognition and predictive analysis may be conducted by artificial intelligence programs. Such programs may fulfill the purpose of evaluating an optimal time or time period for an animal of a particular species being present or the programs may evaluate a predictive analysis resulting in a probability of the appearance of an animal of a particular species during a time period.

Reports may be generated for individual species indicating the best time of day to see that particular species and a species by species report containing that information may be presented to the user. Such information and reports may be generated on a retrospective basis relying solely on historical information or may be generated through the use of predictive algorithms.

Particular adjustments to the probability of an individual species of animal being present at a future time may be adjusted based on the presence of a predatory species and the lingering scent of that predatory species. For example, the estimated probability of identifying a deer in a particular plot may be adjusted downward based on the recent identification of a coyote in a plot that is upwind of the plot for which the prediction is being made.

Adjustments to the probability of an individual species being present at a future time may be updated based on immediate recent sightings of animals of that species in nearby plots. By way of example, it is more likely that a deer will be identified in a particular plot if a deer was located in an adjacent plot a few minutes earlier.

A variety of negative correlation factors may be identified and used in the predictive algorithms. For example, if the presence of deer is negatively correlated with a temperature above 90° F. then the predictive algorithm could account for such a negative correlation. The presence of any number of species generally regarded as threatening to the species for which a prediction is being made would also be an event having a negative correlation that is useful for the prediction of the presence of the species. Similarly the presence of humans may have a negative correlation with the presence of a particular species and the identification of humans may be handled in a manner similar to the handling of other identified animals. Still further, human foot traffic, as opposed to vehicular traffic, may be identified as a negative correlating factor for the presence of individual animals due to the increased scent that may result from human foot traffic.

Cameras associated with this system may have GPS devices and those GPS devices may be used along with other communication equipment to track the location of the cameras if stolen.

Example Set 2

Given the significant potential size of the data set from which predictions of future animal activity can be made the number of predictive algorithms is nearly unlimited. The present example is a simple algorithm for the prediction of an estimated probability of a deer being identified during a three-hour period. For the purposes of this example, time blocks are designated as the eight three-hour periods of a day with the first time block being the period from 12 AM to 3 AM. An estimated probability of seeing one or more deer in the 12 AM to 3 AM time block of a third day is designated "y." That estimated probability, y, may be based on a data set from the first and second days along with an average or mean from the prior two weeks. The variable $x_1$ represents a binary, 1 or 0, answer to whether there was a deer identified in the preceding eight time blocks with 1 representing the answer that there was a deer identified in the animal activity area in the preceding eight time blocks. Namely, for a day-three first time block calculation, $x_1=1$ when at least one deer was identified in the animal activity area during day-two. The variable $x_2$ represents a binary, 1 or 0, answer to whether there was a deer identified in the eight time blocks that preceded preceding eight time blocks with 1 representing the answer that there was at least one deer identified in those time blocks. Namely, for a day-three first time block calculation, $x_2=1$ when at least one deer was identified in the animal activity area during day-one. The variable $x_3$ represents a binary, 1 or 0, answer to whether there was a deer identified in the time block eight time blocks ago, namely 12 AM to 3 AM on day two. The variable $x_4$ represents a binary, 1 or 0, answer to whether there was a deer identified in the time block 16 time blocks ago, namely 12 AM to 3 AM on day one. The variable $x_5$ represents a binary, 1 or 0, answer to whether there was a hog identified in the previous two time blocks, namely the 6 PM to 12 AM period of day-two immediately preceding the time block being predicted. The average or mean incidents of one or more deer being present during a time block over the preceding two weeks may be simply calculated by counting the number of time blocks in the previous 112 in which a deer was identified and dividing that number by 112. In this example, 17 time blocks having deer identifications in the prior two weeks results in M=0.152. Collectively the probability of seeing one or more deer in the 12 AM to 3 AM time block of a third day may be evaluated as according to Equation 1 below.

$$y = Ax_1 + Bx_2 + Cx_3 + Dx_4 + Ex_5 + M \quad \text{(Equation 1)}$$

In Equation 1 the variables A, B, C, D, and E are correlation variables generally valued between −1 and 1. Those variables may be estimated or calculated based on regression analysis, artificial intelligence pattern matching, professional estimation, other comparable means and combinations thereof. Analysis of a significant data set of animal activity within the animal activity area may result in a set of correlation variables such as shown in Table 3 below:

TABLE 3

| | |
|---|---|
| A | 0.162 |
| B | 0.071 |
| C | 0.118 |
| D | 0.011 |
| E | −0.132 |
| M | 0.152 |

Thus, based on the correlation variables of Table 3, if the only activity in the animal activity area were a 1:05 AM deer sighting on day-one, a 2:45 AM deer sighting on day-two and 9:45 PM hog sighting on day-two the estimated probability of seeing one or more deer in the 12 AM to 3 AM time block of a third day would evaluate as follows:

$$y = (0.162)*1 + (0.071)*1 + (0.118)*1 + (0.011)*1 + (-0.132)*1 + 0.152 = 38.2\% \quad \text{(Equation 2)}$$

giving a 38.2% probability of seeing a deer during the 12 AM to 3 AM time block of a third day. Under a different set of circumstances using the same time periods, if the only animal identified over the 16 time blocks preceding the 12 AM to 3 AM time block of the third day was the 2:45 AM deer sighting on day-two, the 12 AM to 3 AM time block of a third day would evaluate as follows:

$$y = (0.162)*1 + (0.071)*0 + (0.118)*1 + (0.011)*0 + (-0.132)*0 + 0.152 = 43.2\% \quad \text{(Equation 3)}$$

The above example is presented to provide an example of how multiple factors may be accounted for in estimating a probability of a certain species being present. The example accounts for the presence of another species, namely that the recent appearance of a hog as being negatively correlated with the likelihood of seeing a deer. Correlation with a larger number of independent predictive variables is contemplated including a wider variety of animals, weather conditions, etc.

As that term is used herein "plot" includes, for example, fields, portions of trails, clearings and other areas traversable by land animals. Plots may also be only a portion of a field, clearing or other area within the habitat of an animal Further the phrase "threatening species" indicates a species that may pose some form of threat to the species being targeted for predictive analysis.

As that phrase is used herein "details sufficient to identify a location within the plot that is being monitored" includes for example a GPS location of a camera that includes an indication of the direction the camera was pointing for the relevant data point. A mere GPS position of the location of a camera without any indication of the direction the camera was pointing would not be considered to contain "details sufficient to identify a location within the plot that is being monitored" as that phrase is used herein.

Methods of counting deer may be used in conjunction with the equipment and methods described herein. For example, at a particular monitored location, deer may be fed for a period of 10 days and counted either during that 10-day period or during a 10-day period following the initial feeding period. The results of the counting may be used to estimate a total number of deer within a geographic region. For example, an estimate of the number of deer per 100 acres could be generated based on the observation and counting. It should be understood that while most of the examples described herein indicate recognition as being the recognition of a single deer or other species in an image, recognition techniques described herein may identify multiple deer or other species in a single image. Such recognition techniques may optionally be used to enhance the predictive abilities of any of the estimation techniques described herein.

A method of evaluating animal activity may, for example comprise positioning a first camera in an animal activity area wherein the first camera comprises a motion detector and wherein the first camera comprises a wireless communication antenna; positioning a second camera in an animal activity area wherein the second camera comprises a motion detector and wherein the second camera comprises a wireless communication antenna; monitoring a first plot for animal movement with the first camera; monitoring a second plot for animal movement with the second camera; identifying a first movement associated with a first animal; capturing a first image of the first animal at a first time using the first camera; performing species recognition on the first image of the first animal wherein the species recognition on the first image of the first animal is sufficient to associate the first animal with a first species group; creating a first species record having details sufficient to identify the first image, the first species group, the first plot and the first time; identifying a second movement associated with a second animal; capturing a second image of the second animal at a second time using the first camera; performing species recognition on the second image of the second animal wherein the species recognition on the second image of the second animal is sufficient to associate the second animal with a second species group such that the performing of the species recognition on the second image of the second animal is done by the first camera; creating a second species record having details sufficient to identify the second image, the second species group, the first plot and the second time such that the first species record has details sufficient to identify a location within the plot that is being monitored; conducting a probability evaluation that utilizes information from the first species record and the second species record to estimate a probability that a member of the first species group will be present at a location at a future time; generating a report that utilizes information from the first species record and the second species record to reflect the pattern of recent activity by the first species group and the second species group on a plot by plot basis.

A method of feeding and evaluating animals may, for example, comprise positioning a first camera in an animal activity area wherein the first camera comprises a motion detector and wherein the first camera comprises a wireless communication antenna; positioning a second camera in an animal activity area wherein the second camera comprises a motion detector and wherein the second camera comprises a wireless communication antenna; monitoring a first plot for animal movement with the first camera; monitoring a second plot for animal movement with the second camera; identifying a first movement associated with a first animal; capturing a first image of the first animal at a first time using the first camera; performing species recognition on the first image of the first animal wherein the species recognition on the first image of the first animal is sufficient to associate the first animal with a first species group; creating a first species record having details sufficient to identify the first image, the first species group, the first plot and the first time; operating an animal feeder based on the first species record wherein the feeder is located remotely from the first camera and the second camera; identifying a second movement associated with a second animal; capturing a second image of the second animal at a second time using the first camera; performing species recognition on the second image of the second animal wherein the species recognition on the second image of the second animal is sufficient to associate the second animal with a second species group; creating a second species record having details sufficient to identify the second image, the second species group, the first plot and the second time; changing the operational status of an electric shock deterrent in response to the second species record wherein the electric shock deterrent is a component of the feeder such that the first species record has details sufficient to identify a location within the plot that is being monitored and conducting a probability evaluation that utilizes information from the first species record and the second species record to estimate a probability that a member of the first species group will be present at a location at a future time. In a related example one or both cameras may monitor the feeder, the operation of the feeder may be controlled wirelessly by a network of three or more cameras located apart from the feeder and at least one camera that does not have the feeder in its field of view may provide instructions for the operation of the feeder. Further, a target species may be identified and the probability of seeing that target species may be predicted based on the presence of another species that threatens the target species. One or more of the cameras described may have infrared image capture capabilities. One or more of the cameras described may have a global positioning system receiver. The species recognition may take place on any of the cameras monitoring the area, on a remote server or on an electronic device associated with a user of the camera. In certain embodiments, either humans in general or human foot traffic in particular may be identified and there may be a corresponding reduction in the probability of identifying the target species based on the presence of human foot traffic. Such probability adjustments relating the presence of humans may be carried out according to the various methods described herein.

Example Set 3

Groups of photos, such as trail camera photos including pictures of white tail deer, may be uploaded to a server. The uploading may be facilitated by an application from a phone or other electronic device, may be uploaded through a website or may be uploaded directly from the device that takes the picture. A digital classification routine may then review each photo to recognize the deer and optionally other species of animals in a manner that associates the presence of the animals in the pictures with a time and geographic location. For example, a white tail deer may be identified at GPS location 30.680169, −91.227594 at Jul. 9, 2018 09:49:15 CDT. Having time and geographic location information, such as GPS coordinates, additional historical weather data, solar data and lunar data associated with the particular location and time of each individual deer identification may be gathered from outside sources. That data may then be used to classify the prior sighting of the white tail deer into a number of categories which may include categories indicated in Tables 4-12. If there were 15 deer sightings at the location in the preceding two weeks, those deer sightings may be broken down into groups of weather classifications, windspeed classifications, wind direction classifications, barometric pressure classifications, temperature classifications, relative humidity classifications, daylight moonlight classifications, moon phase classification, and hour of day classifications.

TABLE 4

| Hour | Sightings |
| --- | --- |
| 12:00 AM | |
| 1:00 AM | |
| 2:00 AM | |
| 3:00 AM | |
| 4:00 AM | 2 |
| 5:00 AM | |
| 6:00 AM | 2 |
| 7:00 AM | |
| 8:00 AM | |
| 9:00 AM | |
| 10:00 AM | 3 |
| 11:00 AM | |
| 12:00 PM | |

TABLE 4-continued

| Hour | Sightings |
|---|---|
| 1:00 PM | |
| 2:00 PM | |
| 3:00 PM | |
| 4:00 PM | |
| 5:00 PM | |
| 6:00 PM | 4 |
| 7:00 PM | 2 |
| 8:00 PM | |
| 9:00 PM | 2 |
| 10:00 PM | |
| 11:00 PM | |

TABLE 5

| Weather | Sightings |
|---|---|
| Mostly Cloudy | 3 |
| Few Clouds | 5 |
| Clear | 4 |
| Partly Cloudy | 2 |
| Overcast | |
| Fog | |
| Freezing Precipitation | |
| Frozen Ice precipitation | |
| Wintery Mix | |
| Rain | 1 |
| Thunderstorm | |
| Snow | |

TABLE 6

| Wind speed | Sightings |
|---|---|
| 0-2 mph | 8 |
| 3-5 mph | 4 |
| 6-10 mph | 1 |
| 11-15 mph | 2 |
| >15 mph | |

TABLE 7

| Wind direction | Sightings |
|---|---|
| Out of North | 7 |
| Out of East | 8 |
| Out of South | 0 |
| Out of West | 0 |

TABLE 8

| Barometric pressure (millibars) | Sightings |
|---|---|
| 800-899 | |
| 900-949 | |
| 950-980 | |
| 981-990 | |
| 991-1000 | 4 |
| 1001-1010 | 8 |
| 1011-1020 | 3 |
| 1021-1030 | |
| 1031-1050 | |
| 1051-1100 | |

TABLE 9

| temperature | Sightings |
|---|---|
| <0° F. | |
| 0 to 10° F. | |
| 11 to 20° F. | |
| 21 to 30° F. | |
| 31 to 40° F. | |
| 41 to 50° F. | |
| 51 to 60° F. | |
| 61 to 70° F. | 1 |
| 71 to 80° F. | 8 |
| 81 to 90° F. | 6 |
| 91 to 100° F. | |
| 101 to 110° F. | |
| >110° F. | |

TABLE 10

| Relative humidity | Sightings |
|---|---|
| 0-20% | |
| 21-40% | |
| 41-60% | 5 |
| 61-80% | 7 |
| 81-100% | 3 |

TABLE 11

| Daylight/moonlight | Sightings |
|---|---|
| Day | 9 |
| Night (moon above horizon) | 4 |
| Night (moon below horizon) | 2 |

TABLE 12

| Moon phase | Sightings |
|---|---|
| New moon | |
| Waxing crescent | |
| First quarter | 6 |
| Waxing gibbous | 6 |
| Full moon | 3 |
| Waning gibbous | |
| Third-quarter | |
| Waning crescent | |

All of the characteristics described in table 4-12 may be classified as either as celestial characteristics or as atmospheric characteristics. Celestial characteristics may include any characteristics relating to the sun and moon and atmospheric characteristics may include any characteristic relating to weather, precipitation and the atmosphere. Celestial characteristics identified in the tables are non-binary characteristics and such non-binary characteristics may lead to more accurate predictions than binary characteristics such as day/night. Further, the characteristic data may come from sources other than the images taken by the cameras and in certain cases the characteristic data may be limited to sources other than the images taken. This can lead to greater accuracy as well. For example, sunrise/sunset data for a particular location is generally much more accurate than the data that can be inferred by the image.

The allocation of sightings within the groups of classifications may then be used to establish relative condition-based tendencies for the animal species being evaluated. In one method of evaluating the likelihood of the presence of the animal species points may be allocated based on raw number of sightings in each category counted as points. For example, using the data in Tables 4-12, points would be calculated as in Tables 13-14 below:

TABLE 13

| Condition | Sightings |
|---|---|
| 4 AM | 2 |
| Clear | 4 |
| 3-5 mph wind | 4 |
| Wind out of the East | 8 |
| 1001-1010 mbar pressure | 8 |
| 61 to 70° F. | 1 |
| 41-60% relative humidity | 5 |
| Night (moon above horizon) | 4 |
| Moon at first quarter | 6 |
| Total points | 42 |

TABLE 14

| Condition | Sightings |
|---|---|
| 5 AM | 0 |
| Partly Cloudy | 2 |
| 6-10 mph wind | 1 |
| Wind out of the North | 7 |
| 991-1000 mbar pressure | 4 |
| 61 to 70° F. | 1 |
| 61-80% relative humidity | 7 |
| Night (moon below horizon) | 4 |
| Full Moon | 0 |
| Total points | 26 |

Tables 13 and 14 are illustrative because there are millions of potential combinations of categories, each yielding their own point total. The primary significance of point totals is relative to other point totals. Using a point total method, an evaluation of the likelihood of seeing the relevant species under the conditions described in Table 13 would be higher than the likelihood of seeing the relevant species under the conditions described in table 14.

After evaluating the relative probability of seeing a white tail deer on a condition group by condition group basis, predictive weather, solar and lunar data may be gathered for the upcoming days. In one example, predictive data matching each hour for the following four days would be classified into categories matching the categories of Tables 4-12 such that the calculated point totals, such as those described in Tables 13 and 14, may be applied to each hour of the upcoming days. The data may then be plotted in a way that graphically depicts the relative probability of seeing a white tail deer at the location where the pictures were originally taken.

There are a wide variety of variations of the above described method for evaluating the relative probability of seeing an animal at a future time at a monitored location. The predictive techniques described herein may be used on any individual species of animal Whitetail deer, turkeys, feral pigs and bears are examples of the species that may be monitored. The identification of species in the individual pictures from a camera may be done at the camera, at a computer or at a mobile device prior to having the data and or pictures subjected to one or more of the pattern evaluation techniques described herein.

The example described above is illustrative and may be varied in several ways such that the pattern evaluation is more detailed, less detailed or merely evaluated using a different set of factors. In a variation of this example set, the presence of predatory or other threatening species may be included in the relative probability analysis. When such instances occur that are negatively correlated with the presence of white tail deer points may be taken away from the relative probability score.

A large number of variations are envisioned for characterizing and categorizing weather and other atmospheric conditions. For example, instead of relative humidity, the wet bulb temperature and dry bulb temperature may be indicated and categorized. Further, the time period for gathering predictive data may be longer or shorter. For example, a year of pictures from a single trail camera may be what is analyzed to arrive at the data set that is the basis for the relative probability prediction.

While the calculations of the present example set are based on simple point totals, it should be understood that correlation factors or other methods of adjusting for the relative predictive strength of various classification groups of categories may be used. For example, the weather condition categories of Table 5 may be more strongly correlated with the presence of white tail deer than the wind speed categories of Table 6. In such cases, the points attributed to the weather condition category may be multiplied by a weather condition category correlation factor. There are a variety of mathematically equivalent and mathematically similar ways that such correlation factors may be applied to adjust for the relative predictive strength of the various classification groups. Further, estimation techniques from other example sets may be incorporated into the present example set in whole or in part.

The handling of categories for features like time classifications and weather classifications may be subject to wide variation regarding what is classified and how those classifications are handled. For example, instead of categorizing time into one-hour segments associated with the time of day, time segments may be broken up based on proximity to sunrise and sunset. In such an example, categories may include the first hour prior to sunset, the second hour prior to sunset, the first hour after sunset, the second hour after sunset, etc. Variations of this type, which more closely track potential observations of a deer or other animal being tracked, may increase the accuracy of the predictive techniques described herein.

While many of the probability assessments described in these examples are directed to a single camera, it should be understood that the same assessment techniques may be used to assess a group of cameras in a particular geographic area. For example, a group of five cameras on a hunting lease may be used to assess the future probability of a deer being sighted on the hunting lease. In such a case the sightings for the particular area may be subjected to a similar calculation routine as would occur for the handling of a group of pictures for a single camera. The geographic scope of the larger areas to be assessed is not particularly limited and may be assessed on an entire country or entire state basis. Regional and local conditions experienced by the deer create unique circumstances that can impact a deer's response to the weather, atmospheric, lunar and solar conditions. For example, on an individual hunting lease, one camera may be situated in an open field and the other camera may have view of a protected thicket. For that reason, it is contemplated that an individual camera predictive analysis may be done along with a local camera group predictive analysis which is further coupled with a regional predictive analysis. The combined predictive analysis may have greater predictive value for the location associated with an individual camera than the analysis of pictures associated with that individual camera in isolation from the other cameras. There are many potential ways to combine the local, area and regional predictive results to get a composite result. An arithmetic mean of the local, area and regional probabilities is one example of how an individual location prediction may be enhanced.

Example Set 4

Assessments of the probability of seeing an animal such as a white tail deer may be evaluated based on observed time-based rates of occurrence of those deer. The gathering of images, processing the images to recognize the relevant species and gathering of historical information may be carried out as presented in other examples. Utilizing the same groupings of conditions described in Tables 4-12, each individual classification from the categories may be evaluated to determine a total number of instances in which the deer were sighted and a total duration of the classified condition. For example, in a 14-day window, the 4 AM hour as shown in Table 4 would have a total of two sightings and a total duration of 14 hours yielding a 4 AM conditional citing rate of 0.143 sightings/hour. The total rate of deer sightings during the 14-day observation period would be 0.045 sightings/hour. Historical weather data retrieved from the Internet, a remote database, website or other source may be used to either calculate or estimate the total amount of time a particular condition existed during the period being evaluated. For example, it may be determined that mostly cloudy conditions prevailed for a total duration of 101 hours during the 14-day period. The rate of sightings per hour may then be calculated resulting in a value of 0.030 sightings/hour under mostly cloudy conditions. Utilizing this technique on the sightings described in Table 5, that table can be expanded to account for the sightings and the duration of individual conditions. Default values along with high and low limits on the resulting established sightings per hour result may be utilized to prevent unreasonably high and unreasonably low rates from populating the rate values, thereby limiting unnecessary inaccuracies. For example, for conditions with zero duration, the rate of sightings per hour may be set at a default value which may be the background rate of sightings per hour.

TABLE 15

| Weather | Sightings | Duration (hrs.) | Rate (sightings/hour) |
| --- | --- | --- | --- |
| Mostly Cloudy | 3 | 101 | 0.030 |
| Few Clouds | 5 | 64 | 0.078 |
| Clear | 4 | 25 | 0.160 |
| Partly Cloudy | 2 | 58 | 0.034 |
| Overcast | 0 | 14 | 0.000 |
| Fog | 0 | 19 | 0.000 |
| Freezing Precipitation | 0 | 0 | N/A (0.045 sightings/hour) |
| Frozen Ice precipitation | 0 | 0 | N/A (0.045 sightings/hour) |
| Wintery Mix | 0 | 0 | N/A (0.045 sightings/hour) |
| Rain | 1 | 20 | 0.050 |
| Thunderstorm | 0 | 35 | 0.000 |
| Snow | 0 | 0 | N/A (0.045 sightings/hour) |

If the time period being predicted was the 4 AM hour on the following day, which was predicted to have mostly cloudy conditions and a series of other matched classifications corresponding to Tables 4-12, the probability of sighting a deer may be evaluated according to the equation below.

$$R_t * W_t + R_w * W_w + R_s * W_s \ldots R_p * W_p = \text{Predicted Rate}$$

In that equation, $R_t$ represents the rate of sightings per hour for the 4 AM hour, which may for example be 0.110. $W_t$ represents the weighting factor associated with the time category which may be 0.05. $R_w$ represents the rate of sightings per hour for weather category being applied to the hour being predicted. Referring to Table 15, $R_w$ is 0.030 for the mostly cloudy conditions associated with the prediction. A rate and weighting factor may be applied for each of the nine categories such that a predicted rate is produced. For a one-hour period being predicted, dividing the predicted rate by the time would yield an estimated probability of seeing a deer during that period. Weighting factors may be calculated based on aggregated data derived from a larger set of sightings for the same species including data from a multitude of other cameras, may be estimated based on experience or may be developed by other methods. These weighting values may be used to indicate the relative predictive abilities of the various categories of classifications. In the above equation, the sum of all weighting factors may add up to 1.0.

In examples where the probability assessments are made on a server apart from the electronic devices owned and possessed by the user, various communications may be sent to the user by text message, through email, push notification, through a phone or computer applications or through other Internet communications. Such communications may occur on a periodic basis or when a certain probability threshold is met. Various notices may be provided such as: "This Thursday between 3 and 4 PM will be the best opportunity to see a white tail deer by camera 1." In order to accommodate such notices, a server may periodically conduct analysis for active or selected users using already available historical data and freshly updated forecast data to make the prediction. Any number of reports, charts or graphs may be provided in a similar fashion. Depending on the user preference, notifications reports, charts and graphs may be limited to daylight hours. Such limitations may be of interest to hunters.

While many activities such as species recognition, analyzing patterns and correlating conditions to the presence of particular species are often described as taking place on a server separate from the camera(s) and local devices used by a user/hunter, such activities may take place in a variety of locations including onboard the camera, within a users phone or portable electronic device or on the user/hunter's computer.

Localized historical and predictive weather data may be obtained from a third party service such as is available at https://darksky.net/. As that term is use herein "image" encompasses both photos and video and it should be understood that the recognition techniques and pattern matching techniques described herein may accept photos, videos or both as part of the predictive methods described.

Example Set 5

Evaluations comparable to those described in previous examples may be practiced with the aid of artificial intelligence tools. In a manner similar to that described in Example sets 3 and 4 above, an individual may provide a series of images from one or more cameras so that the images are digitally processed for the recognition of particular species within the series of images. In the process of doing so, a data set is generated that is sufficient to identify the time and location for each instance in which the animals were identified. Historical weather, solar and lunar data are then gathered so that a detailed attribute set may be associated with each instance of the particular species.

After the steps associated with the identification of the relevant species, a more detailed and granular data set may be utilized to evaluate future probabilities. Individual deer sightings, which may include the number of deer in a sighting may be included in the data set associated with a time date stamp as opposed to an indication of the hour in which the sighting occurred. Weather maybe indicated by category similar to previously described methods. Wind speed may be described by actual wind speed and a heading. For example, an individual deer sighting may contain data such as wind blowing at 5 mph from heading 110°. Barometric pressure and temperature may take the form of directly measured or estimated actual values rather than categories. Relative humidity may similarly be indicated as actual. While localized data received from outside sources may give simple details for celestial data, known calculation techniques may be used to convert simple celestial data into more useful and more predictive celestial data. For example, sunrise, sunset, moonrise, moonset and moon phase data for a particular location may be converted into features like solar altitude and percentage of visible illumination of the moon.

In one example, a fully granular detailed record of animal sightings for a historical time period coupled to the associated celestial and atmospheric conditions would be generated as a data set. In a related example, complete sets of celestial and atmospheric conditions would be obtained for the entire time period for which images were processed. As an example, celestial and atmospheric conditions for every half hour covering a one-month period of images may be obtained and the incidence of deer sighting would then be associated with the half hour by half hour data set. Data sets of either variety or other similar varieties may be used as the input for an artificial intelligence analysis.

That chosen data set, having celestial and atmospheric conditions along with the records of animal sightings may then be subjected to a neural network type artificial intelligence data analysis seeking patterns associated with the sightings of deer. The results of the artificial intelligence analysis may then be analyzed to identify correlation factors associated with the presence of the sighted animal species and weighting factors associated with the strength of correlation. From that information predictive tables, equations or other digital assessment tools may be developed. The tools may be similar to those identified in previous examples, but may also include correlations to more complicated factors. As an example, deer sightings may be correlated to combined factors such as the co-occurrence of rising temperature and falling barometric pressure. As previously indicated, the scope of data analyzed may vary and predictive tables, equations or other digital assessment tools associated with individual cameras may be combined with similar tools reflective of larger patterns, such as regional patterns.

After the artificial intelligence generated tools or tool generated based on the results of the artificial intelligence analysis are available, predictive weather data associated with a particular camera may be acquired and subjected to any calculations necessary to achieve a celestial and atmospheric condition data set comparable to the celestial and atmospheric condition data set that was processed by the artificial intelligence system. In a manner that may be similar to the methods described in examples sets 4 and 5, the correlation factors may be applied to the predicted weather data in a way that generates either estimated probabilities or estimated relative probabilities of sighting a deer at the location being analyzed.

The use of large databases and artificial intelligence permits pattern identification and predictive analysis on a scale that would otherwise be difficult to achieve. Machine learning environments that may be used for correlation and prediction relating to conditions include Tensor Flow and Keras available at https://keras.io/ (Original author, Francois Chollet). The OpenCV library at https://opencv.org/and the YOLO library.

Example Set 6

A variety of reports may be generated for an end-user relating to the probability assessments or the reports may be generated by the end user based on a data set generated by techniques described herein. Example reports may include a simple indication of the highest probability time or time period of the targeted animal being present. Such results may for example be presented in a pie chart. Also, a multi-day forward-looking graph of either the probability or relative probability of seeing the targeted animal may be presented to the end-user. That graph may take the form of a bar chart, a line graph, a smooth curve or other similar data presentation. When a user has multiple camera locations, a map may be used to display the historical incidence of animal movement which may include representations of animal movement between cameras. Similarly, predictive reports may be produced on a map in a way that indicates the time-based probabilities of seeing the target species on the map. Further, a best time and place to hunt indication may be given as part of a map-based report or other non-map-based report. A simplified version of such a report may indicate that the best time and place to hunt. That identification may be by camera and time. For example, it may be indicated that the best time and place to hunt is in front of camera number three between 4 and 5 PM on Tuesday.

Various charts and graphs may be used to indicate the concentration of individual species sightings according to any number of variables described herein. Those charts and graphs may indicate the total number of animal sightings per category or may indicate the frequency of animal sightings per category. Users may be provided the ability to filter results by various categories. For example, a user may be able to generate a report indicating the other conditions most favorable for seeing a particular animal when it is raining.

Example Set 7

A significant number of recognizable features may be used in the characterization of individual animal sightings associated with a particular species and those features may further be used in the characterization of a local population of animals. In certain instances, the recognizable features may be used to aid the counting of a population in an area. In particular, those recognizable features may be used to improve upon a raw count of animal sightings by adjusting for duplicate counts of individual animals. More particularly, those recognizable features may be used to more fully account for the population of deer in a particular area along with activity patterns within the population.

The description of recognizable features in this example set is drawn to populations of deer, but related characteristics may be used in the characterization and counting of other species.

Figure 4:
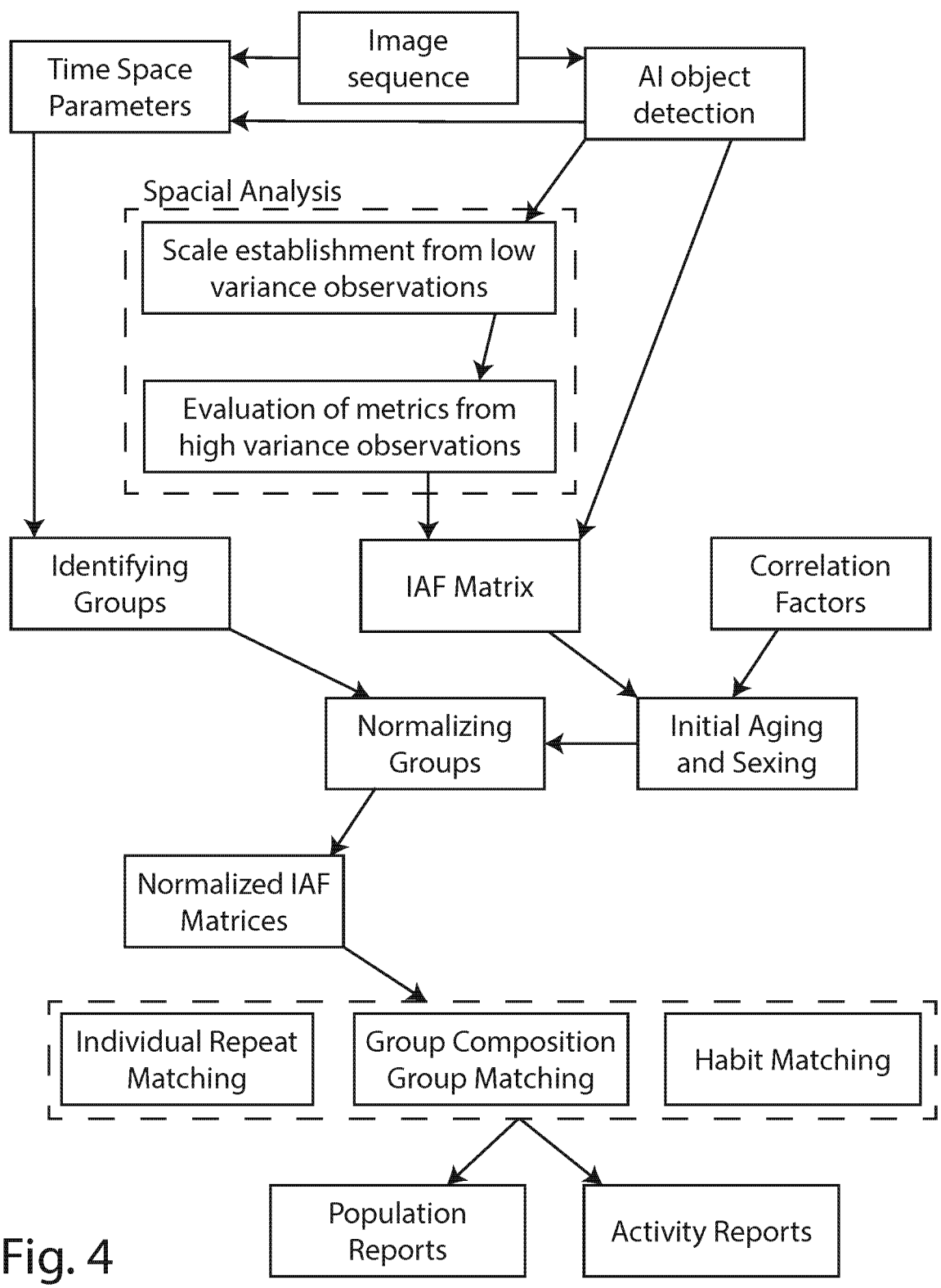
FIG. 4 shows a process flow chart for evaluating deer populations.

Using trail cameras as described herein or otherwise an image sequence containing an individual deer may be evaluated. The image sequence may contain any number of photographs or frames in the case of video. The image sequence may also contain only a single photograph or frame. An illustrative example of how to handle image sequences is depicted in FIG. 4. As described in the following examples, image sequences are tied to particular sightings of deer. For example, in a series of 200 frames of video in which a first deer is present and identified for the first 130 frames and a second deer is present and identified in the final 125 frames, there would be a first image sequence of 130 frames associated with the first deer and a second image sequence of 125 frames associated with the second deer.

Artificial intelligence object detection may be conducted initially for the purpose of identifying if a deer is present in an individual image. For those images in which a deer is detected by artificial intelligence, further artificial intelligence object detection may be conducted to detect a more detailed set of artificial intelligence identifiable objects. Alternatively, the full set of artificial intelligence object detection may be conducted initially.

A nonexhaustive list of potential objects for artificial intelligence recognition includes: deer body facing camera, deer body profile, deer body quartering (~45°), deer body posterior, deer head facing camera, deer head profile, apparent point where rear leg meets belly, deer neck, deer rear leg, antlers present for deer head facing camera, antlers present for deer head in profile, left antler points for deer head facing camera (separately identifiable as antler point 1 antler 0.2, etc.), antler points for deer head profile (separately identifiable as antler point 1 antler 0.2, etc.), antler main beam one for deer head facing camera, antler main beam two for deer head facing camera, antler main beam for deer head profile, sway back, visible ribs, nose depression, fawn spots, 1 year old female, 2-year-old female, 3-year-old female, 4-year-old female, 5-year-old female, 6-year-old female, 1-year-old male, 2-year-old male, 3 year old female, 4-year-old male, 5-year-old male, 6-year-old male, pregnant belly, left ear tip, right ear tip, left ear base, right ear base, left eye, right eye, nose tip. Optionally instead of using broad object identification for a 1-year-old female, 2-year-old female, etc. the object recognition may be by smaller categories such as 1-year-old female deer body facing camera, 1-year-old female deer body profile, 1-year-old female deer body quartering (~45°), 1-year-old female deer body posterior, 1-year-old female deer head facing camera, 1-year-old female deer head profile, 1-year-old male deer body facing camera, 1-year-old male deer body profile, 1-year-old male deer body quartering (~45°), 1-year-old male deer body posterior, 1-year-old male deer head facing camera, 1-year-old male deer head profile, etc.

As described herein, observations relating to distances within a two-dimensional image may be characterized as a distance in pixels. When measuring in pixels, the distance between two pixels when one pixel is 10 pixels to the left and 10 pixels up from the other pixel would be characterized as a distance of 14 pixels when rounding. In other words, standard rules of geometry would apply to these characterizations and measurements along with the other characterizations and measurements described herein unless otherwise noted.

Individual objects recognized during the artificial intelligence detection process may be subjected to boundary detection techniques such that the space occupied in an image by the object is known. A variety of useful information may be gleaned from the location of the objects and the spacial relationships of the objects.

From the object information recognized in an image, certain quantities may be calculated that tend to change less between deer than other quantities. These quantities may be characterized as lower variance observations. Examples of low variance observations include the distance between the two tips of the ears, the distance between the base of an ear and the tip of an ear, the circumference of an eye and the distance between the center of an eye to the end of the nose.

In cases where a deer head facing the camera is identified, the distance between the two tips of the ears; the distance between the base of an ear and the tip of an ear; and in some cases the circumference of the eye may be used as low variance observations. The pixel distance between the two tips of the ears may be regarded as 16 inches or some other similar adjusted amount based on the species of deer and the characteristics of the deer in the area. The pixel distance between the base of an ear and the tip of an ear may be regarded as 6 inches or some other similar adjusted amount based on the species of deer and the characteristics of the deer in the area. The pixel distance of the circumference of an eye may be regarded as four inches or some other similar adjusted amount based on the species of deer and the characteristics of the deer in the area.

In cases where a deer head profile is identified, the distance between the center of the eye and the end of the nose may be used as low variance observation. The pixel distance between the center of the eye and the end of the nose may be regarded as six inches or some other similar adjusted amount based on the species of deer and the characteristics of the deer in the area. The circumference of the eye may also be used as low variance observation in that situation.

Figure 5:
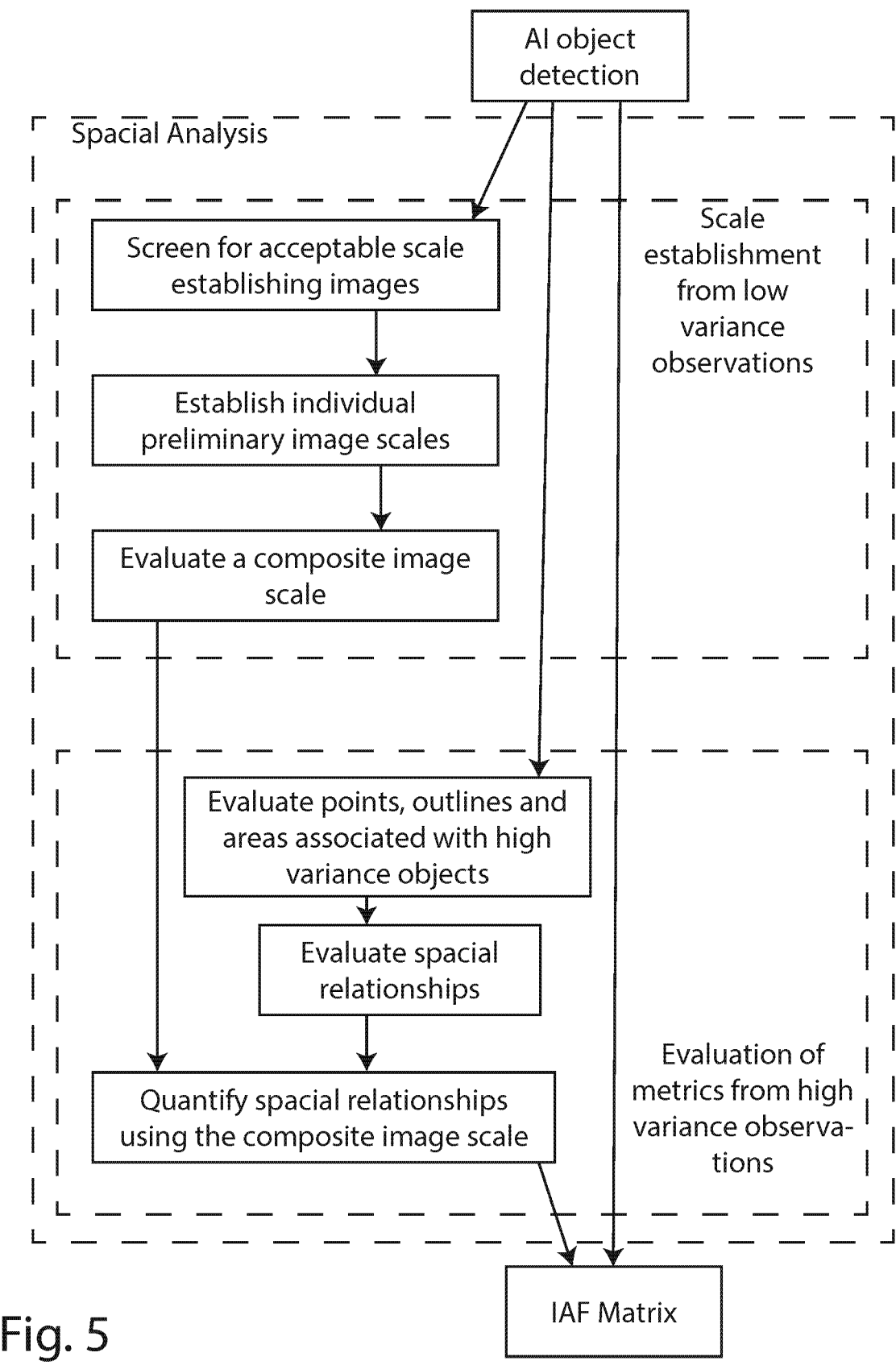
FIG. 5 shows details relating to the setting of a scale and evaluation of metrics.

FIG. 5 depicts an example of a general flow of steps which may be used in the spatial analysis of images. The low variance observations that are gathered may be used to create a composite image scale for the deer in a particular image which correlates pixel distances to actual distances such as inches. For example, if a particular set of images allows for the calculation of more than one pixel to distance ratio, then a composite pixel to distance ratio may be calculated by averaging or some other method designed to accurately reflect the collective observations. For example, if an identified deer measures at 8 pixels/inch for the ear tip to ear tip and that same deer from the same image sequence measures at 10 pixels/inch for the eye center to nose tip distance using the standard distances described above, and those are the only two calculated measurements of low variance observations then the evaluation of the other features of the deer may be conducted using 9 pixels/inch as the image scale. This type of composite scaling may increase the accuracy over non-composite scaling.

In the case where a deer moves a significant distance over the course of an image sequence, then the image sequence may be broken down into more than one image subsequence such that in each subsequence of images, a scale is established from low variance observations.

The above-described scale establishment from low variance observations may be made more accurate by an appropriate programming designed for the screening of acceptable images. For example, programming may limit any establishment of the distance between the center of the eye and the end of the nose so that no such measurement may be recorded as a low variance observation unless deer head profile object recognition indicates that there is greater than a 97% chance that the recognized object is a deer head profile. Such limitations may avoid the establishment of an erroneous composite image scale and may enhance the later evaluation of metrics associated with a particular deer. Other similar limitations which serve the purpose of screening out lower quality images and less representative images may also be applied to increase the representativeness of the composite image scale.

After some number of individual image scales associated with an image sequence are identified, calculated, and recorded, an evaluation may be conducted to establish a composite image scale associated with the image sequence that may be applied over the entire image sequence or in the case of image subsequences applied over the entire image subsequence. A variety of techniques may be used to develop the composite image scale including an arithmetic mean of the individual scales. Because real-world distances are generally underrepresented in images by the distance between the two points not being at equal distances from the camera, the maximum of the pixels/distance readings may be selected as the most useful distance. In certain examples, especially examples with large numbers of individual image scale values, statistical or other program dictated methods may be used to pick an individual scale value that is the best representation of scale for the composite image scale.

By establishing a composite image scale for an image sequence, spatial evaluations within an image may have significantly greater utility and applicability because metrics from those images would be more in line with the observable metrics of the deer at the time the image was taken.

Either as part of the artificial intelligence analysis or through programming using the results of the artificial intelligence analysis various objects identified may be evaluated as points, outlines, areas, or combinations thereof. A variety of techniques may be used to accomplish this including edge detection and other similarly available techniques and methodologies for manipulating images.

Using the composite image scale along with the feature outline and locations, higher variance observations may be characterized and recorded as associated with a particular image, image sequence, or image subsequence. Example higher variance observations which may be recorded include: the area of the rear leg or the width of the rear leg, as may be measured at a height based on the apparent point where the rear leg meets the belly; the area of the front leg or the width of the front leg, as may be measured at a height based on the apparent point where the front leg meets belly; the area of the deer body; the diameter or general area of the neck in the picture; the vertical separation of the belly and the back of the deer; and other information useful to characterize the size features or gender of the deer. These values may be presented as measurements in inches or in areas such as square inches as appropriate.

A more massive neck may be associated with a deer being male. Neck width may be measured in a variety of ways. As one example, the neck width may be the shortest straight-line distance in pixels across the neck that does not include any part of the head. The techniques selected for measuring the neck width is generally less important than the consistency of the application of that standard. Another technique would be to identify the total area of the object identified as the neck after appropriate conversion from pixels to distance.

Many other correlations may similarly be derived from spatial data such as measurements of the size of the legs of the deer being correlated with the sex of the deer. Namely, larger legs are associated with bucks.

Higher measurements associated with rear leg width may be positively correlated with a deer being male and with a deer being older. Further any number of additional indicators of sex and age may be incorporated into the system for similar evaluations. Additional metrics and generally available knowledge about the relative development of bucks, does, and fawns may be used to enhance the accuracy of the system in predicting age and sex. Further, as a larger number of metrics are established from the higher variance observations and those metrics are compared to the more direct indications of sex and age, entirely new metrics and comparative metrics may be established. For example, if the ratio of the area of the front leg to the area of the rear leg ends up being indicative of sex or age, that correlation may be incorporated into the system to more accurately predict sex or age as appropriate.

The values of the evaluations from the low variance observations and the high variance observations may be recorded in a matrix of individual analysis factors as described below.

Example Set 8

Referring again to FIG. 4 of the drawings, potential identifications having met any prerequisite thresholds for further analysis may be identified, analyzed or quantified to populate the matrix associated with the image sequence. The matrix may contain basic information relating to the sighting and individual analysis factors which are the pieces of information useful in evaluating the composition and patterns of the population of deer. Individual analysis factors may be combined into a matrix or other similar data collection system which may serve to store information about a particular deer sighting. Matrices of individual analysis factors are sometimes referred to herein as "IAF matrices" for the sake of brevity. Matrices may be identifiable by the time date stamp of the initial image of the image sequence or by other similar information. In the case of a series of photographs or video the series may be sequential and may cover a short enough period of time that the images can reliably indicate the same deer from a largely similar perspective. Table 16 below is an illustrative matrix in partial form abbreviated for clarity and brevity. That matrix may include data relating to a series of objects and the probability that those objects have been identified in a particular image. For example, a value of 0.993 may indicate a 99.3% chance that a particular object has been recognized.

TABLE 16

Example IAF matrix

| Matrix Position | Value Type | Example Value |
|---|---|---|
| 1 | deer body facing camera | 0.000 |
| 2 | deer body profile | 0.983 |
| 3 | deer body quartering (45°) | 0.020 |
| 4 | deer body posterior | 0.000 |
| 5 | deer head facing camera | 0.986 |
| 6 | deer head profile | 0.001 |
| 7 | apparent point where rear leg meets belly | 0.912 |
| 8 | deer neck | 0.935 |
| ... | | |
| 25 | left ear tip | 0.958 |
| 26 | right ear tip | 0.967 |
| 27 | left ear base | 0.912 |
| 28 | right ear base | 0.902 |
| 29 | left eye | ∅ |

TABLE 16-continued

Example IAF matrix

| Matrix Position | Value Type | Example Value |
|---|---|---|
| 30 | right eye | ∅ |
| 31 | nose tip | ∅ |
| ... | | |
| 46 | ear tip to ear tip scaling factor (pixels/inch) | 4.481 |
| 47 | ear base to ear tip scaling factor (pixels/inch) | 3.214 |
| 48 | Eye center to nose tip scaling factor | ∅ |
| 49 | Composite image scale (pixels/inch) | 3.848 |
| ... | | |
| 61 | Body area (square inches) | 347.0 |
| 62 | Front leg area (square inches) | 36.9 |
| 63 | Rear leg area (square inches) | 64.13 |
| ... | | |
| 53 | initial aging (years old) | 3.2 |
| 54 | initial sexing (0 = male 1 = female) | 0.871 |
| 55 | normalized sexing | 1.0 |

Population of the IAF Matrix for a particular image sequence may happen sequentially. Initial artificial intelligence analysis may be directed to AI object detection of deer heads and bodies. This may be done for an entire image sequence and the movement of the head or the body through the various images may be used to determine if image subsequences are necessary. After a deer head or body is identified in a series of images additional analysis may be conducted. The following description is directed to a single image or an image sequence having sufficient internal consistency that movement of the deer does not necessitate establishing differing scales. After the AI object detection of deer heads and bodies is complete then a preprogrammed selection of additional object detection efforts may be conducted based on the usefulness of the additional object detection efforts. For example, reasonable opportunities to evaluate the apparent point where the rear leg meets the belly would likely only be successful in circumstances where there has been an identification of a deer body profile. In the cases where deer body profile had been detected then the apparent point where the rear leg meets the belly would be identified. Absent the deer body profile identification, the position in the matrix associated with the apparent point where the rear leg meets the belly would remain a null value. Thus the matrix may contain many null values representing pieces of information that were not able to be acquired from the image sequence. As another example, the left ear tip and the right ear tip may only be evaluated under circumstances in which a deer head facing the camera was identified. This is true because the point identification of the tips is primarily useful in evaluating the distance between those tips and conducting that evaluation may be inaccurate in circumstances other than the case where a deer head facing the camera has been identified. The identification of a deer neck may be limited to cases where the deer body is identified in profile. In cases where the deer neck is identified in other circumstances, for example when the deer body is quartering, it would likely be appropriate to have two separate characterizations. The first of those separate characterizations would be for the deer neck when the deer body is in profile and the second would be the identification of the deer neck when the deer body is quartering. The significant segmentation of features in the matrix allows for more consistent identification and evaluation of real-world sizes of deer and parts of deer. In other words, the apparent size of the neck of the deer identified as quartering may be significantly smaller than the apparent size of the neck of a deer that has its body in profile. Whether or not the artificial intelligence object detection tool associated with a deer neck operates as separate tools for the identification of a deer neck with the deer body in profile and a deer neck with the deer body quartering, the segmentation of the data in the matrix allows for greater precision in the later comparison of deer. In instances where a series of images that are part of an image sequence result in a series of detections of the same object, a predefined program may aggregate the values used to populate the matrix. For example, in a series of 40 images identifying a deer body in profile the deer body profile identification value—expressed as a confidence between 0.000 and 1.000 with 1.000 being 100% confidence—may be expressed as the maximum confidence from the series of images or may be determined by algorithm from the series of values.

As described above, after the individual object identifications occur, a variety of spatial analysis techniques may be applied to locate particular artificial intelligence object detection identified objects in space including the boundaries of certain objects.

Measurements of the locations of certain objects may be used in the preparation of a scale for the image. For example, the distance in pixels between the left ear tip and the right ear tip may be evaluated so that that value can be compared to a standard distance between the left ear tip in the right ear tip. The pixel distance and the standard distance may be arithmetically evaluated to come up with a ear tip to ear tip scaling factor, which may for example be in pixels per inch. That scaling factor is a significant indicator of the actual size and dimensions of other objects that may be identified on the deer in the relevant image or series of images. That value may, using the example of Table 16, be stored in matrix position 46. In the event that multiple individual images in the image sequence are regarded as high enough quality to produce values for position 46 and the matrix, the value of the arithmetic mean may be used, the maximum value may be used, or an algorithm may be used to determine a representative value.

The evaluation of multiple images in an image sequence or in an image subsequence presents significant opportunities for more detailed and more accurate evaluation of the deer present in the image sequence. In particular, it presents the opportunity for the capture and evaluation of multiple low variance observations on the same deer and also presents the opportunity for the capture and evaluation of multiple high variance observations on the same deer. For example, a deer standing in one place may go from being identifiable as a deer head in profile view to being a deer head facing the camera. With that opportunity in the same image sequence the total information available for the deer is higher and correspondingly the matrix is better populated with quality data. This greater quantity of data creates better opportunities for data comparison between sightings and increases the opportunity to successfully match a deer sighted in an individual image sequence to a deer sighted in an image sequence that may occur days or even months later.

The set of high variance observations pertaining to antlers may, for example, be gathered and utilized in the following way aiding both in the identification and matching of deer and in the characterization of deer. The characterization of deer may be used for the purpose of estimating the size of a set of antlers and those estimations may be tailored to give estimates of widely utilized scoring systems such as the Boone and Crockett club official scoring system for North American big-game trophies published by the Boone and Crockett club located at 250 Station Dr., Missoula, Mont.

The various scoring systems of this variety may be characterized generally as antler scores or as scoring systems. Antlers may be identified generally as artificial intelligence recognizable objects associated with deer heads generally or they may be associated with particular orientations of deer heads. For example, when a deer head facing the camera is recognized, the presence of antlers on a deer head facing the camera may be a separately recognizable object and the search for that separately recognizable object may be limited to circumstances when there is a relatively high confidence that a deer head facing the camera has already been identified. Similar programed limitations may used for the identification of antlers on a deer head in profile. In that situation where antlers have been detected associated with a deer head facing the camera, a separate object identification for a first antler main beam and then a second object identification or a second antler main beam similarly associated with the deer head facing the camera may be conducted. Edge detection or other boundary identification techniques sufficient to outline the first and second antler main beams may be used to provide a two-dimensional outline of the main beam of each antler. Similarly, edge detection or other boundary identification techniques may be used to create a two-dimensional outline of the entire antler set. Having these outlines allows for the calculation of a first main beam tip to second main beam tip spread, namely the distance between those two points. It also allows for the calculation of the inside spread of the main beams, the largest internal spacing between the main beams. Having the outline of the entire set allows for the calculation of the greatest total spread of the antlers. Because most images taken in the wild will be significantly limited in their ability to identify all points on an antler rack, estimates of spread of the main beam of the types described above may form the most accurate baseline for predicting the total extent of the antlers which may be represented by an antler score. Such scores may be handled by a function or algorithm which predicts a total antler score based on a correlation between one or more of the spread measurements and total scores. The correlation may be in the form of a function that is programmed to automatically calculate the antler score based on the results of the artificial intelligence object detection and associated outlining functions. The calculations related to characterization may proceed with the same scale establishment from low variance observations described above allowing for the representation of distances to be actual distances rather than distances in pixels. Further, when dealing with a number of images within an image sequence the selection of a representative value for the population of each potentially duplicate value in the IAF matrix may be done by taking averages of usable values, taking the maximum of the usable values or by other algorithmic or statistical selection technique deemed most appropriate for the accurate representation of the value being included in the IAF matrix. Correlations relating to the length of main beams may also be conducted for images identifiable as the deer head facing the camera in a manner similar to that described below.

Artificial intelligence object detection may be conducted to identify the tip and the base of one or both main beams of the antlers to aid in the estimation of the total size, scope, and score of a set of antlers. Utilizing image analysis of the outline of the main beam, a line can be constructed to roughly follow the centerline of the main beam from the tip of the main beam to the base of the main beam. The characterization of the distance of that line may be converted from pixels to actual distance using the techniques described herein and the value may be recorded as a distance associated with the main beam and the head orientation of the deer. Separate correlations would be used in the case of a deer head facing the camera and in the case of a deer head in profile due to the fact that the two-dimensional representation of the length of the main beam is an underrepresentation of the actual length of the main beam both facing the camera and in profile. Separate correlations are used because the degree of underrepresentation of actual length is different for the two situations.

The number of antler points identifiable from a particular view by artificial intelligence object detection may be counted and the count of those points may be entered into the IAF matrix. Using the other techniques described herein, the identifiable count of points be used as a correlation factor for the scoring of the antlers.

The various identifications of antler objects and distances which may be calculated may each be stored separately in the IAF matrix and each serve as data separately indicative of the features of the antlers. The preparation of a composite prediction of the size, scope, or score of a particular set of antlers may be handled collecting the relevant data from each category of information quantifying the antler set and evaluated by algorithm or other technique to produce a composite estimate of the size, scope, or score of a particular set of antlers which may be in the form of a score or may be in the form of a range of potential scores for the antler set. Information from the various types of correlations may be maintained as part of the IAF matrix because the data from the individual assessments may be used in the later evaluations of the likelihood of whether a deer identified in the present image sequence is the same deer identified in a separate image sequence at another time or place.

Example Set 9

The IAF matrix may serve as a metaphorical fingerprint identifying attributes of the deer which to varying degrees differentiate that deer from other deer. Because the IAF matrix is capable of identifying the best representations of a variety of parameters over the course of an image sequence, the IAF matrix may be a significantly improved representation of the unique nature of a deer than may be achievable through the analysis of a single image.

The IAF matrix contains both direct indications of the age of a deer, such as the artificial intelligence object identification of a one-year-old female, and indirect indications of the age of a deer, such as the area encompassed within the outline of the deer body in profile. Collectively these indications vary from not indicative of age to weakly indicative of age to strongly indicative of age. Each element of the matrix may be subjected to correlation factors or functions which evaluate the individual matrix values by algorithm or otherwise to develop a collective assessment of the age of the deer. The collective assessment of the age of the deer may be recorded as another entry in the IAF matrix. Using Table 16 as an example, the value for the age may be recorded in position 53 as the initial aging.

The IAF matrix contains both direct indications the sex of a deer, such as the artificial intelligence object identification of a one-year-old female, and indirect indications of the sex of a deer, such as the area encompassed within the outline of the hind leg of a deer body in profile. Collectively these indications vary from not indicative of sex to weakly indicative of sex to strongly indicative of sex. Each element of the matrix may be subjected to correlation factors or functions which evaluate the individual matrix values by algorithm or otherwise to develop a collective assessment of the sex of the deer. The collective assessment of the sex of the deer may be recorded as another entry in the IAF matrix. Using Table 16 as an example, the value for the initial sexing of the deer may be recorded in position 54 as the initial sex.

In certain examples, the image sequences will have sufficient information to locate each individual image in time and space such as with global positioning data associated with the images. The time space association allows for the identification of groups of deer traveling together. When only an individual camera is involved, image sequences—which are tied to the appearance of individual deer—may be identified as groups of deer when their individual appearances are connected by time. As an example, if the image sequence for a first deer is separated by less than two minutes from the image sequence for a second deer which is in turn separated by less than two minutes from the image sequence for third deer then the first second and third deer may be regarded as a group. When multiple cameras are in reasonable proximity to one another the identification of a group may be conducted by a combination of time and space parameters.

The imperfect nature of evaluations conducted relating to sex may be improved upon by the normalizing of groups of deer. This normalizing of groups is designed to improve upon the individual sexing of deer to make those sex determinations better conform to the typical groups that deer travel in at various times of year. For example, if a group of three deer is initially identified as a group of adult deer having an initial sexing as represented by entry 54 in the example IAF matrix above of 0.953, 0.625, and 0.981 respectively then a normalizing algorithm may record at position 55 in the respective matrices for those image sequences 1.0, 1.0, and 1.0, indicating that the group has been identified as a group of females. Various thresholds or algorithms may be set up as part of the step of normalizing the groups for sex to determine when normalizing is appropriate. The normalization may serve to better match groups of deer in circumstances where, by observation, reasonable assumptions may be made about those deer that were less fully characterized. Such observations may tend to identify groups of adult females, groups of adult males and groups of adult females with fawns. The routine for normalization of groups would generally not make an adjustment in situations where artificial intelligence and the associated tools discussed herein strongly identify individuals of opposite sex in a group. For example, a group of two deer having an initial sexing as represented by entry 54 of 0.054 and 0.923 may record at position 55 in the respective matrices for those image sequences 0.054 and 0.923 reflecting no adjustment by normalizing of groups of the sex of the deer in those image sequences.

As a result of the normalizing the IAF matrices described above, over a period of time which may include collecting image sequences from multiple cameras, a database of normalized IAF matrices including time space data which reflects groupings of deer would be available. That data set may be evaluated in a variety of ways that allows for the better understanding of the population of deer present in the area. One or more of three techniques may be used to evaluate and better characterize the deer sightings. Those three techniques may be classified as individual repeat matching, group composition group matching, and habit matching. The goal of each of the three techniques is to more accurately assess the number of deer actually viewed by the camera(s) by accurately identifying when individual deer were viewed by the camera multiple times and by identifying when groups of deer were viewed by the camera multiple times.

Individual repeat matching occurs when characteristics of an individual deer which may be identifiable by the makeup of its IAF matrix is identified in multiple image sequences. This type of individual repeat matching may be conducted based on an aggregate number of close matches in the individual elements of the IAF matrices being compared. The use of metrics from the spatial analysis of the image sequences may have significant utility in matching individual deer from one image sequence to another.

Individual repeat matching is useful for the purposes of matching both individual deer and groups because individuals often move around in groups of consistent composition. As that term is used herein, "individual repeat matching" refers to deciding that one or more deer from different image sequences are likely the same deer based on metrics derived in part on artificial intelligence object detection. When individual repeat matching matches an individual that is part of a group to that same individual in a different image sequence, the individual common to the two groups may be used to match the two groups as being the same group of deer that has showed up again at a different time. The individual repeat matching removes one or more inaccuracies, as compared to conventional counting, by properly identifying the reappearance of a deer or group of deer rather than committing the error of counting the same deer over and over again as new deer. The individual repeat matching further allows for the identification of movement over time of an individual deer or group of deer that was the subject of the individual repeat matching.

The next matching that may occur is group composition group matching. As that term is used herein, "Group composition group matching" refers to deciding that two separately identified groups of deer are composed of the same group individual deer reappearing as a group at a different time based in part on data derived from artificial intelligence object detection reflecting the composition of the group. Group composition group matching may occur when the composition of a group is unique enough that it is likely that reappearance of a group having similar composition indicates that the group is a repeat group. Thresholds for the identification of a unique group may be programmed and adjusted as needed. For example, a very permissive threshold may identify two does and to fawns as a unique group. In another example, larger numbers may be required to identify a unique group such as four does and three fawns. Although the group composition group matching may be subject to some degree of error, it should allow for a more accurate count of the total number of deer identified and better account for the movement of the groups identified by the technique. In a related example, the group composition group matching may be conducted along with a more permissive version of individual repeat matching. Thus, a group composition group matching of two different groups of deer may include some level of individual repeat matching as a confirmation that the group composition group matching was accurate before a group is identified as a repeat group.

Additionally, habit matching may be used to identify deer that have repeat occurrences in front of the camera. As that term is used herein, "habit matching" refers to deciding that two separately identified appearances of deer are composed of the same individual deer reappearing at a different time based in part on data from artificial intelligence object detection and based on the pattern of the reappearance(s). In the case of habit matching the group that is matched may be as small as a single deer. Habit matching identifies individual deer or groups of deer that engage in repeating patterns of activity. For example, a single buck that shows up on a particular camera in the hour after sunrise on two consecutive days may be identified as the same buck. Various thresholds may be set for the similarity of time and space regarded as meeting the criteria for group have it matching. As with group composition group matching, habit matching may be done in conjunction with some level of individual repeat matching as a confirmation that the habit matching is an appropriate and/or validated match.

Individual repeat matching, group composition group matching, and habit matching may be referred to herein as repeat matching techniques. The phrase "repeat matching technique(s)" as used herein refers to one or more of those three techniques. The repeat matching techniques allow for the conducting of reports on the count location and activity of deer in the area and may result in counts that are significantly more accurate than conventional deer counts which traditionally do not account for repeats. The repeat matching techniques also allow for significant activity reports that can reflect the movements of individual deer and groups of deer in a way that aids in the understanding of the deer population.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

What is claimed is:

1. A method of evaluating a population of deer comprising:
    a. receiving a series of images containing deer;
    b. utilizing artificial intelligence object detection to identify a first deer in a first image from the series of images;
    c. utilizing artificial intelligence object detection to identify two points on the first deer in the first image;
    d. utilizing a spatial relationship between the two points to create an image scale;
    e. utilizing the image scale to identify a set of metrics associated with the first deer;
    f. evaluating the gender of the first deer;
    g. evaluating the gender of a second deer traveling with the first deer;
    h. reevaluating the gender of the first deer based in part on the result of the evaluating the gender of the second deer;
    i. utilizing a first repeat matching technique to evaluate if the first deer in the first image is a likely reappearance of a previously identified deer;
    j. wherein the image scale relates distance within the series of images to physical distance on the first deer.

2. The method of evaluating a population of deer of claim 1 wherein the first repeat matching technique is individual repeat matching.

3. The method of evaluating a population of deer of claim 1 wherein the first repeat matching technique is group composition group matching.

4. The method of evaluating a population of deer of claim 1 wherein the first repeat matching technique is habit matching.

5. The method of evaluating a population of deer of claim 1 wherein the first repeat matching technique is individual repeat matching, wherein a second repeat matching technique is utilized, and the second repeat matching technique is group composition group matching.

6. The method of evaluating a population of deer of claim 1 wherein the first repeat matching technique is individual repeat matching, wherein a second repeat matching technique is utilized, and the second repeat matching technique is habit matching.

* * * * *